(12) United States Patent
Lin et al.

(10) Patent No.: US 7,406,588 B2
(45) Date of Patent: Jul. 29, 2008

(54) DYNAMICALLY RECONFIGURABLE STAGES PIPELINED DATAPATH WITH DATA VALID SIGNAL CONTROLLED MULTIPLEXER

(75) Inventors: Tay-Jyi Lin, Hsinchu (TW); Chein-Wei Jen, Hsinchu (TW); Chih-Wei Liu, Hsinchu (TW); Po-Han Huang, Hsinchu (TW); Wei-Sheng Huang, Hsinchu (TW); Chan-Hao Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 149 days.

(21) Appl. No.: 11/229,616

(22) Filed: Sep. 20, 2005

(65) Prior Publication Data

US 2006/0259748 A1 Nov. 16, 2006

(30) Foreign Application Priority Data

May 13, 2005 (TW) .............................. 94115696 A (51) Int. Cl.
*G06F 9/38* (2006.01)
(52) U.S. Cl. ...................................... 712/219; 712/225
(58) Field of Classification Search ........................ None
See application file for complete search history.

(56) References Cited

U.S. PATENT DOCUMENTS 5,168,499 A * 12/1992 Peterson et al. ............... 714/30
5,734,808 A * 3/1998 Takeda ......................... 345/419
6,247,134 B1 6/2001 Sproch et al. ................ 713/320
2007/0067608 A1 * 3/2007 Lofgren et al. .............. 712/219

FOREIGN PATENT DOCUMENTS

JP 408-147163 A * 6/1996

OTHER PUBLICATIONS

Thucydides Xanthopoulos, et al., "A Low-Power IDCT Macrocell for MPEG-2 MP @ ML Exploiting Data Distribution Properties for Minimal Activity", IEEE Journal of Solid-State Circuits, vol. 34, No. 5, May 1999.
Suhwan Kim, et al., "Reconfigurable Low Energy Multiplier for Multimedia System Design", downloaded from internet URL portal. acm.org/citation.cfm?id=838111 on Aug. 23, 2005, IEEE Computer Society Annual Workshop on VLSI, p. 129, Apr. 27, 2000.

* cited by examiner

*Primary Examiner*—Kenneth S Kim
(74) *Attorney, Agent, or Firm*—Harness, Dickey & Pierce, P.L.C.

(57) ABSTRACT

A pipelined datapath with dynamically reconfigurable pipeline stages is provided, having a pipeline controller which generates clock signals and selects signals based on a system clock and a valid data signal to control each of the registers and each of the multiplexers in the pipeline circuit. In other words, when a valid datum is being processed, the pipeline register is activated to latch the output of the combinational logic circuit; otherwise, when an invalid datum is received, the register is not activated and the datum bypasses the register through a multiplexer. Therefore, the pipeline stages of the pipelined datapath are dynamically reconfigured to save the power dissipation effectively.

14 Claims, 7 Drawing Sheets

DYNAMICALLY RECONFIGURABLE STAGES PIPELINED DATAPATH WITH DATA VALID SIGNAL CONTROLLED MULTIPLEXER

BACKGROUND

This Non-provisional application claims priority under 35 U.S.C. § 119 (a) on Patent Application No. 94115696 filed in Taiwan on May 13, 2005, the entire contents of which are hereby incorporated by reference.

1. Field of Invention

The invention relates to a pipelined datapath and, in particular, to a pipelined datapath with dynamically reconfigurable pipeline stages.

2. Related Art

Portable electronic devices become popular in recent years. Since the portable electronic devices often rely on batteries, how to lower the power consumption is an important issue in the circuit designs. Increasing the efficiency of battery uses will also increase the competitive power of the portable devices.

Traditionally, most of the low power circuits are designed by optimizing their static conditions. That is, the circuit design consideration is based on the worst operating environment. However, such design logic cannot fully satisfy the consumer's needs as the portable electronic devices are demanded to have higher efficiencies and lower power dissipation. Therefore, structure designers propose to dynamically reduce the power consumption according to the operating environment using a power-aware system. In other words, the conventional lower-power designs focus on reducing the work voltage, minimizing logic switching, and simplifying the circuit complexity. Even lower power consumption can be achieved by further using a power-aware datapath (e.g. dynamically reconfiguring the datapath imposed with the work voltage according to the currently processing task).

Take the pipeline structure as an example, the conventional low-power design can increase the throughput of the datapath and reduce the required work voltage. Pipeline registers are added to effectively avoid extra or unnecessary logic switching, i.e. short-time pulse glitches. However, the price one has to pay is to waste some power on such registers. Therefore, it is necessary to provide a good method to reduce the power consumption on the registers.

Figure 1:
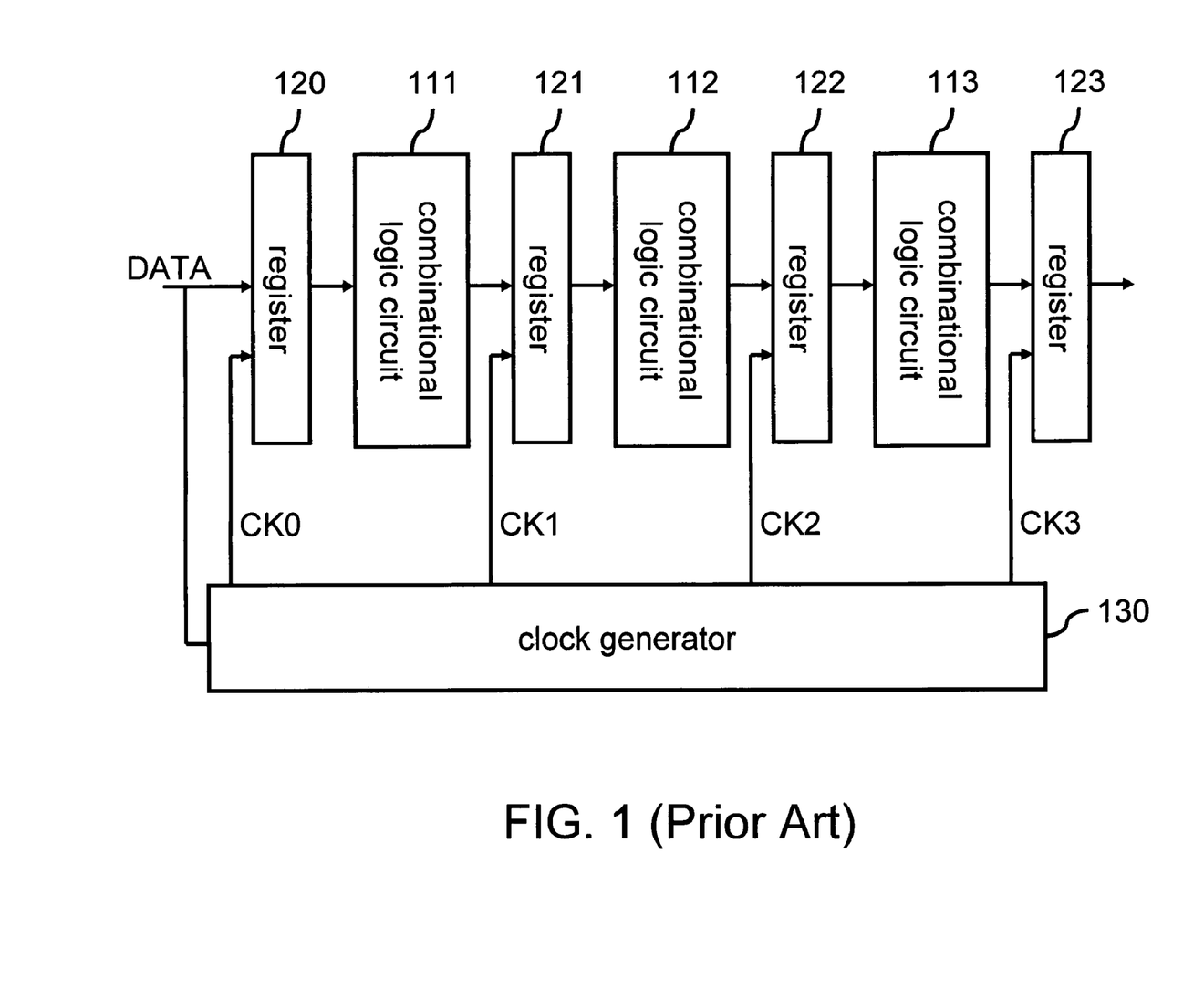
FIG. 1 is a schematic block diagram of a conventional pipelined datapath.
Figure 2:
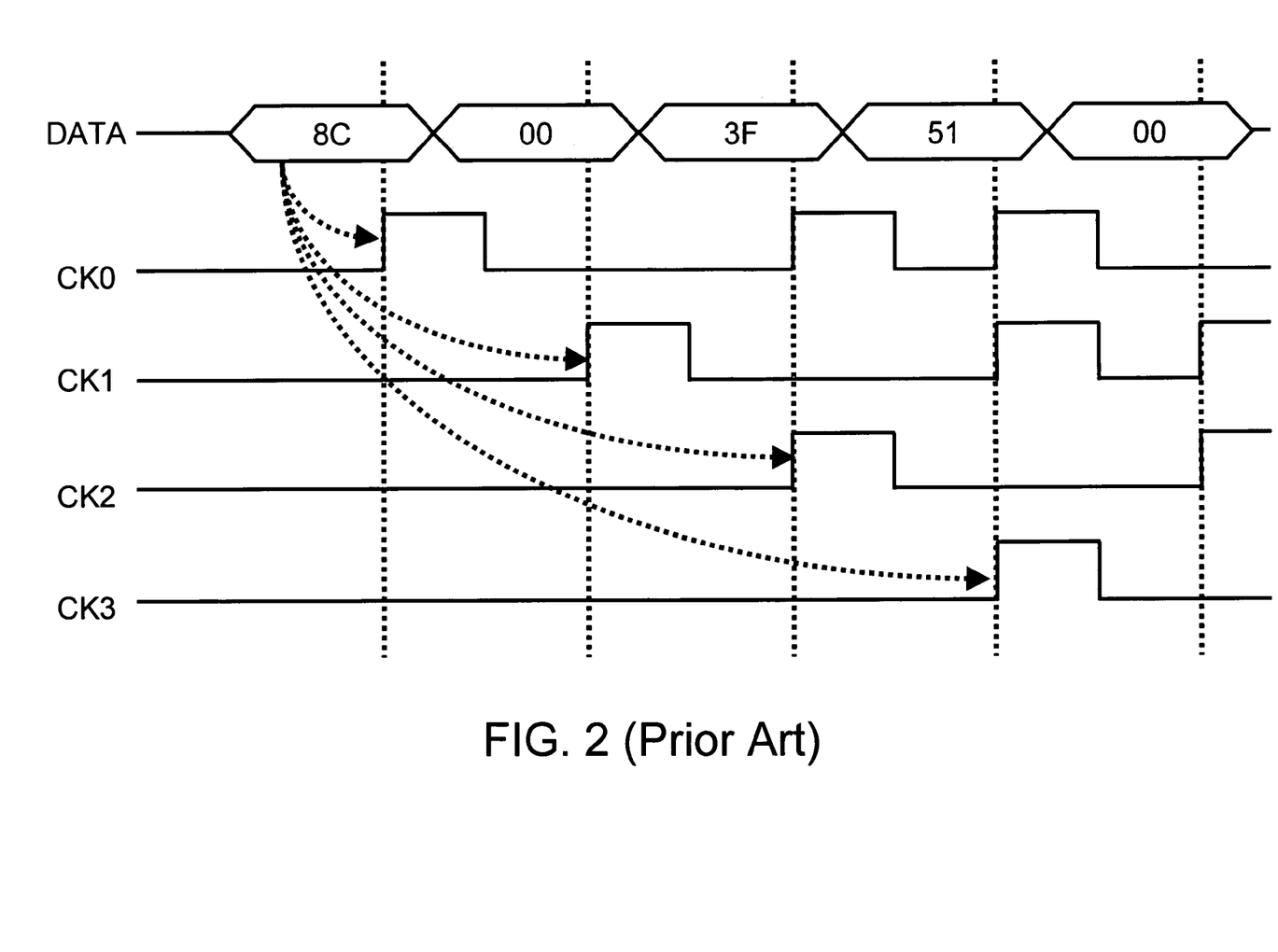
FIG. 2 is a time-order diagram of the conventional pipelined datapath in FIG. 1.

Various methods have been proposed to reduce the power consumption in the registers. One method is to utilize clock gating in the pipeline structure, as shown in U.S. Pat. No. 6,247,134 B1 and the articles by Xanthopoulos et. al. (see Thucydides Xanthopoulos and Anantha P. Chandrakasan, "A Low-Power IDCT Macrocell for MPEG-2 MP@ML Exploiting Data Distribution Properties for Minimal Activity," IEEE Journal of Solid-State Circuits, Vol. 34, No. 5, P693-P703, May, 1999). With reference to FIGS. 1 and 2, in a three-stage pipeline structure each stage is a combinational logic circuit 111, 112, 113 linking to a register 121, 122, 123. The input terminal of the pipeline circuit is provided with a register 120. Each register 120 to 123 is controlled by a clock signal CK0 CK1, CK2, CK3 generated by a clock generator 130 according to the input data DATA. That is, when the input datum is valid (non-zero datum), then the registers 120 to 123 move the datum from left to right in a lock-step way. In each clock cycle, the registers 121 to 123 latch the output of the combinational logic circuits 111 to 113 according to the received clock signals CK1 to CK3 for processing the datum. When an invalid datum is received (e.g. the datum in a multiplier datapath with a vanishing coefficient), the registers hold the output of the combinational logic circuits to avoid power consumption. In other words, the pulse of each clock signal is transmitted stage by stage with the valid data. When invalid data enter, the registers are not activated to achieve the power-saving effect. In such clock gating method, each valid datum has to pass the register in each stage of pipeline in order to go from the input terminal to the output terminal. However, in the applications that do not require high throughput, there is still unnecessary waste due to extra clock pulses. This is because no fast yield is required and the design considers the worst operating conditions.

Figure 3:
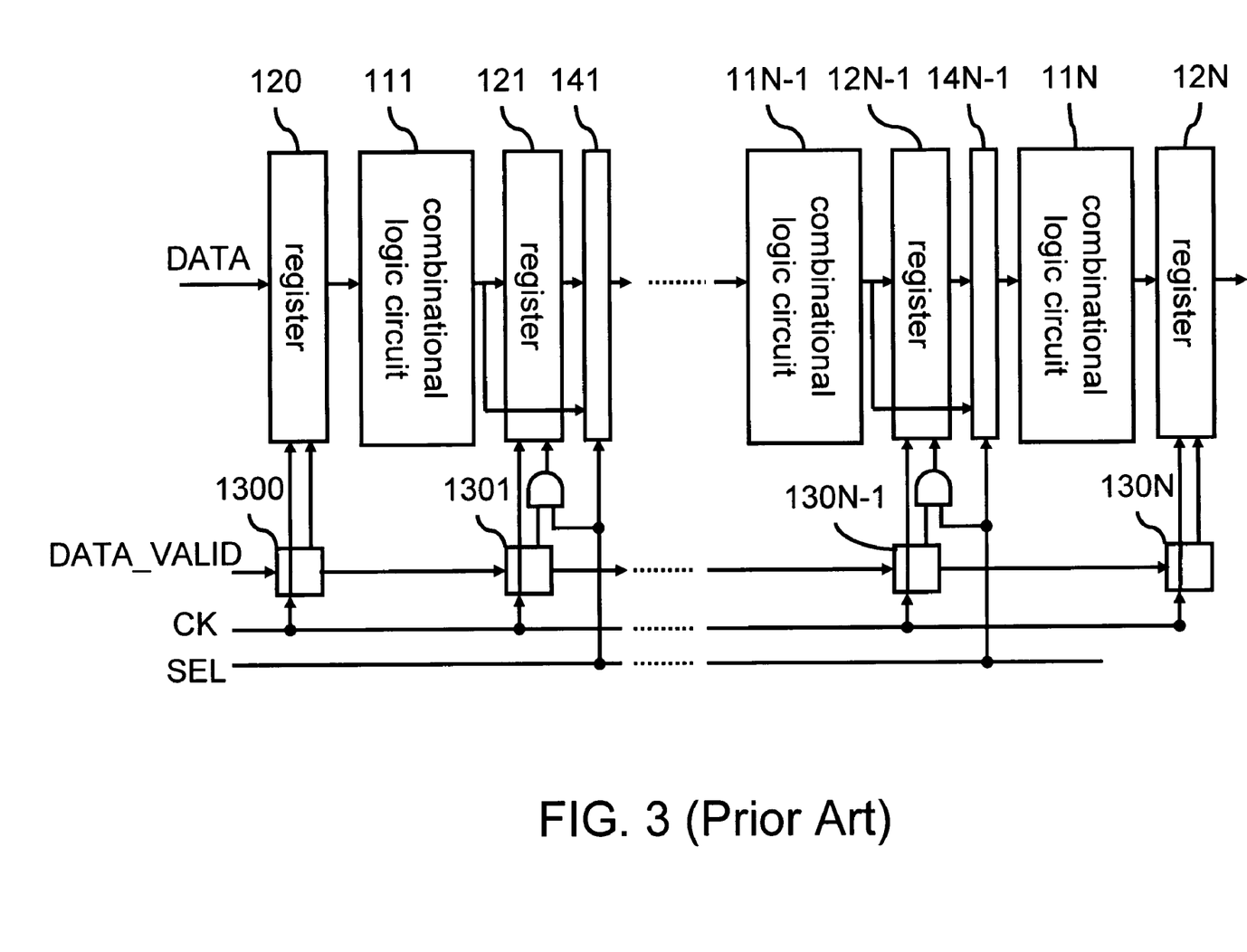
FIG. 3 is a schematic block diagram of another conventional pipelined datapath.

Another method utilizes a reconfigurable pipeline structure, which reconfigures the stages of pipeline structure according to the yield requirement. That is, when the dynamical yield requirement is low, the pipeline stages can be reduced; otherwise, the pipeline stages are increased in advance. Such an example is given in Kim et. al. (Suhwan Kim and Marios C. Papaefthymiou, "Reconfigurable Low Energy Multiplier for Multimedia System Design," Proceedings of the IEEE Computer Society Annual Workshop on VLSI (WVLSI'00), p. 129, Apr. 27-28, 2000). With reference to FIG. 3, when the yield requirement is low, the clock gates 1300, 1301 to 130N-1, 130N turn off some registers and skip them using multiplexers 141 to 14N-1. Therefore, the number of registers can be reduced to save power needed for data access. In fact, the registers 120 to 12N are still controlled synchronously by the system clock CK and move data from left to right in the lock-step way. In each clock cycle, the registers 121 to 12N latch the output of the combinational logic circuits according to the valid data signals DATA_VALID for performing data processing. When the datum passes a register that is turned off by the clock gate, a select signal SEL controls the multiplexer for the datum to bypass the register. Here the clock gates 1300 to 130N control the use of the system clock CK to determine the on and off of the registers 120 to 12N. Although this structure can make adjustments according to different applications, the adjustments require the knowledge of the valid data ratio at the input terminal for determining the pipeline stages. Therefore, the design is very complicated. To reconfigure the stages, one has to be sure that all data existing in the pipeline registers have to be finished before switching to another stage state, ensuring the data accuracy.

Since the conventional methods of reducing the power consumption of the registers have some problems, how to reduce the power consumption of the registers is thus an important study subject.

SUMMARY OF THE INVENTION

In view of the foregoing, an object of the invention is to provide a pipelined datapath with dynamically reconfigurable pipeline stages, which dynamically changes the stages of the pipeline according to the ratio of valid input data, thereby effectively reducing the power consumption in the pipelined registers.

The pipelined datapath with dynamically reconfigurable pipeline stages disclosed herein does not require the knowledge of the ratio of valid input data in advance.

The pipelined datapath with dynamically reconfigurable pipeline stages disclosed herein activates the registers only when necessary. Thus, there are no superfluous clock pulses.

The pipelined datapath with dynamically reconfigurable pipeline stages disclosed herein can ensure the accuracy of data processing during pipeline stage changes without the need to perform pipeline flush.

The pipelined datapath with dynamically reconfigurable pipeline stages disclosed herein involves a lower complexity in the control mechanism.

To achieve the above objects, the lined datapath with dynamically reconfigurable pipeline stages disclosed herein includes a pipeline controller and a pipelined circuit with one input register and N stages, where N is a positive integer greater than 1. The pipeline controller receives a system clock and a valid data signal. (N+1) clock signals and (N−1) select signals are generated according to the system clock and the valid data signal. The input register in the pipelined circuit is coupled to the pipeline controller to receive a clock signal for selectively receiving a datum. Each pipeline stage is connected in series, and the first pipeline stage is coupled to the input register. Aside from the Nth pipeline stage, each pipeline stage includes: a combinational logic circuit, a register coupled to the combinational logic circuit, and a multiplexer coupled to the combinational logic circuit and the register. The combinational logic circuit is used to process data. Each register also couples to the pipeline controller and receives a clock signal from the pipeline controller. The clock signal is used to selectively latch the output of the coupled combinational logic circuit. Moreover, each multiplexer couples to the pipeline controller and receives a select signal from the pipeline controller. The select signal is used to selectively output the data from the combinational logic circuit and the data from the register to the combinational logic circuit of the next pipeline stage. The Nth pipeline stage includes: a combinational logic circuit and a register. The combinational logic circuit of the Nth pipeline stage is coupled to the multiplexer of the (N−1)th pipeline stage for processing data. The register is coupled to the pipeline controller and the combinational logic circuit and receives a clock signal from the pipeline controller. The clock signal is used to selectively latch the output of the coupled combinational logic circuit.

The pipeline controller includes: a controller and (N+1) logic elements. The controller is coupled to each multiplexer for generating N enable signals and (N−1) select signals according to the valid data signal. The select signals are output to the individual multiplexers to control their actions. Among the logic elements, the first logic element is coupled to the input register and generates a clock signal to control the input register according to the system clock and the valid data signal. The other logic elements are coupled to the controller and the registers of all stages for generating the clock signal according to the system clock and the enable signal from the controller, thereby controlling the coupled registers.

When a valid datum is received, the pipeline register is activated by a received clock signal with a pulse to latch the data output. The datum from the register is output by the multiplexer coupled to the activated register. When an invalid datum is received, the register is not activated because the received clock signal does not contain any pulse. The datum bypasses the register through a multiplexer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Generally speaking, input data usually contain a lot of invalid data, whose operation result is irrelevant to the pipeline processing (i.e., nonprocessing or repeating). For example, in the inverse discrete cosine transform (IDCT) algorithm, the input data often contain a lot of invalid data, such as the data with vanishing coefficients in the datapath of a multiplier. That is, entering a zero is an unnecessary action because zero multiplying any number is still zero. Therefore, generating data for such processes is irrelevant. Therefore, the invention uses a pipeline controller to activate the register for latching the output of combinational logic circuits when a valid datum is received. When an invalid datum is received, the register is not activated and the multiplexer is reconfigured for the data to bypass the register. This can effectively reduce the power consumed by the pipeline registers.

Figure 4:
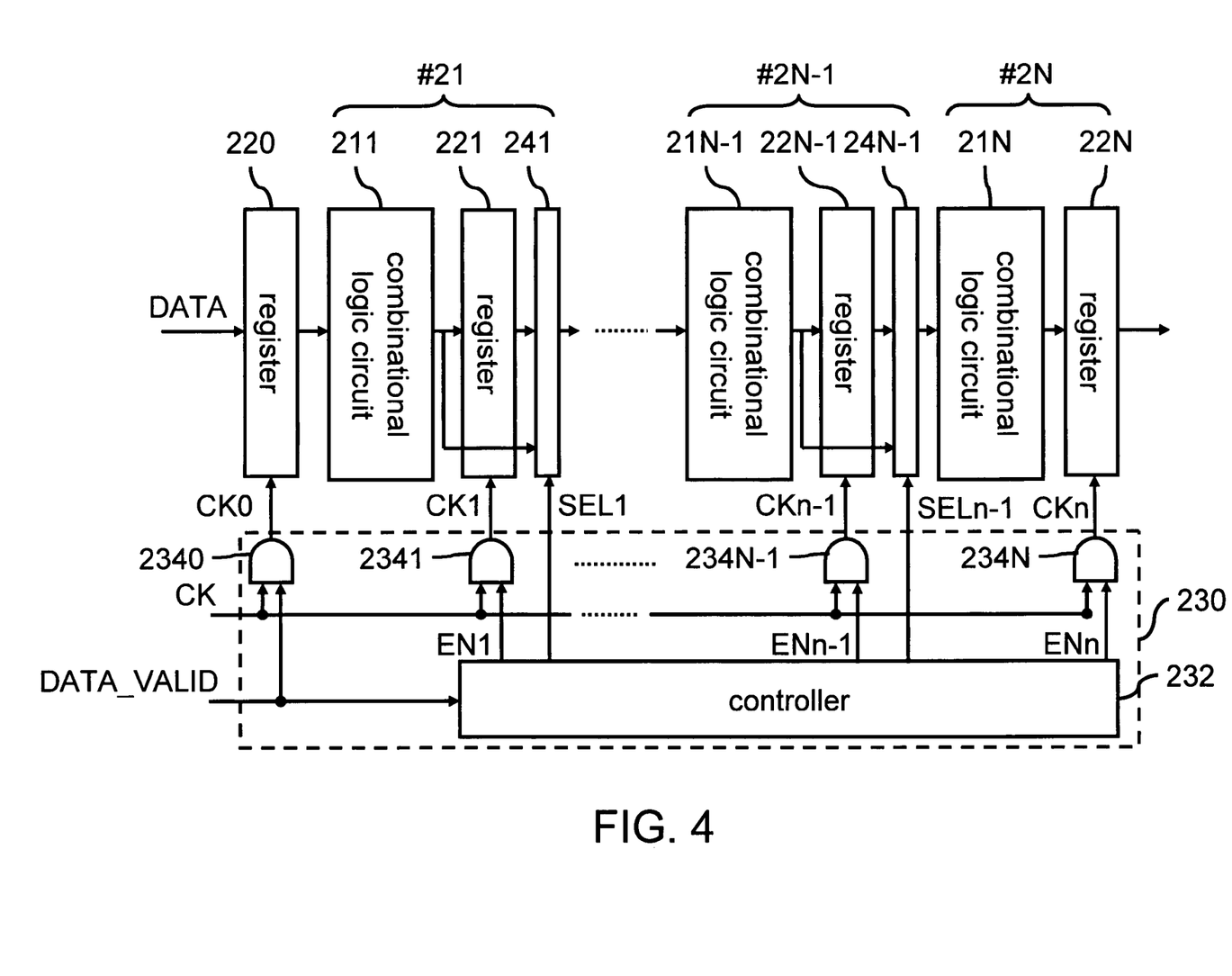
FIG. 4 is a schematic block diagram of the pipelined datapath with dynamically reconfigurable pipeline stages according to an embodiment of the invention.

With reference to FIG. 4, the pipelined datapath with dynamically reconfigurable pipeline stages according to an embodiment of the invention includes a pipelined circuit. The pipelined circuit includes N pipeline stages #21 to #2N−1, #2N, where N is a positive integer greater than 1. Aside from the output pipeline stage, each pipeline stage #21 to #2N−1 includes a combinational logic circuit 211 to 21N−1, a register 221 to 22N−1 and a multiplexer 241 to 24N−1. The output of the combinational logic circuit is coupled to the register and the multiplexer. The output of the register is coupled to the multiplexer. The output of the multiplexer is coupled to the input of the combinational logic circuit in the next stage. The last stage #2N in the pipelined circuit is the output stage. It includes a combinational logic circuit 21N and a register 22N. The input terminal of the pipelined circuit is provided with an input register 220. A pipeline control device 230 is coupled to each register 220, 221 to 22N−1, 22N and each multiplexer 241 to 24N−1. The system clock CK and the valid data signal DATA_VALID are used to control the actions of the input registers 220, 221 to 22N−1, 22N and the multiplexers 241 to 24N−1. The valid data signal DATA_VALID is the data signal of whether each bit in the input data needs to be processed. Here the pipeline control device 230 generates the clock signals CK0, CK1 to CKn−1, CKn according to the system clock CK and the valid data signal DATA_VALID and outputs them to the registers 220, 221 to 22N−1, 22N for controlling the actions of the registers 220, 221 to 22N−1, 22N. Moreover, select signals SEL1 to SELn−1 are generated according to the valid data signal DATA_VALID and output to the multiplexers 241 to 24N-1 that are coupled to the output terminals of the registers 221 to 22N-1. This controls whether the signal transmitted to the next stage by the multiplexers 241 to 24N-1 should bypass the register.

The pipeline control device 230 contains a controller 232 and several logic elements 2340, 2341 to 234N-1, 234N. In this embodiment, the controller 232 is coupled to the multiplexer 241 to 24N-1 in each pipeline stage #21 to #2N-1 and to the register 221 to 22N-1, 22N in each pipeline stage #21 to #2N-1, #2N via the logic elements 2341 to 234N-1, 234N. A logic element 2340 connects to the input register 220 at the input terminal and generates the clock signal CK0 according to the system clock CK and the valid data signal DATA_VALID. Moreover, the controller 232 generates enable signals EN1 to ENn-1, ENn and the above-mentioned select signals SEL1 to SELn-1 according to the valid data signal DATA_VALID. The enable signals EN1 to ENn-1, ENn are transmitted respectively to the logic elements 2341 to 234N-1, 234N. At the same time, the system clock CK is also transmitted to the logic elements 2341 to 234N-1, 234N. The logic elements 2341 to 234N-1, 234N generate the clock signals CK1 to CKn-1, CKn according to the received enable signals EN1 to ENn-1, ENn and the system clock CK, thereby determining whether to activate the registers 221 to 22N-1, 22N. Besides, the select signals SEL1 to SELn-1 are transmitted to the multiplexers 241 to 24N-1, respectively, in order to select the output of the multiplexers 241 to 24N-1 according to the activation of the registers 221 to 22N-1. Therefore, a least number of registers are activated according to the yield requirement. The pipeline stages of the datapath are dynamically reconfigured according to the data status in order to effectively reduce the power consumption. In particular, the logic elements are AND gates.

Figure 5:
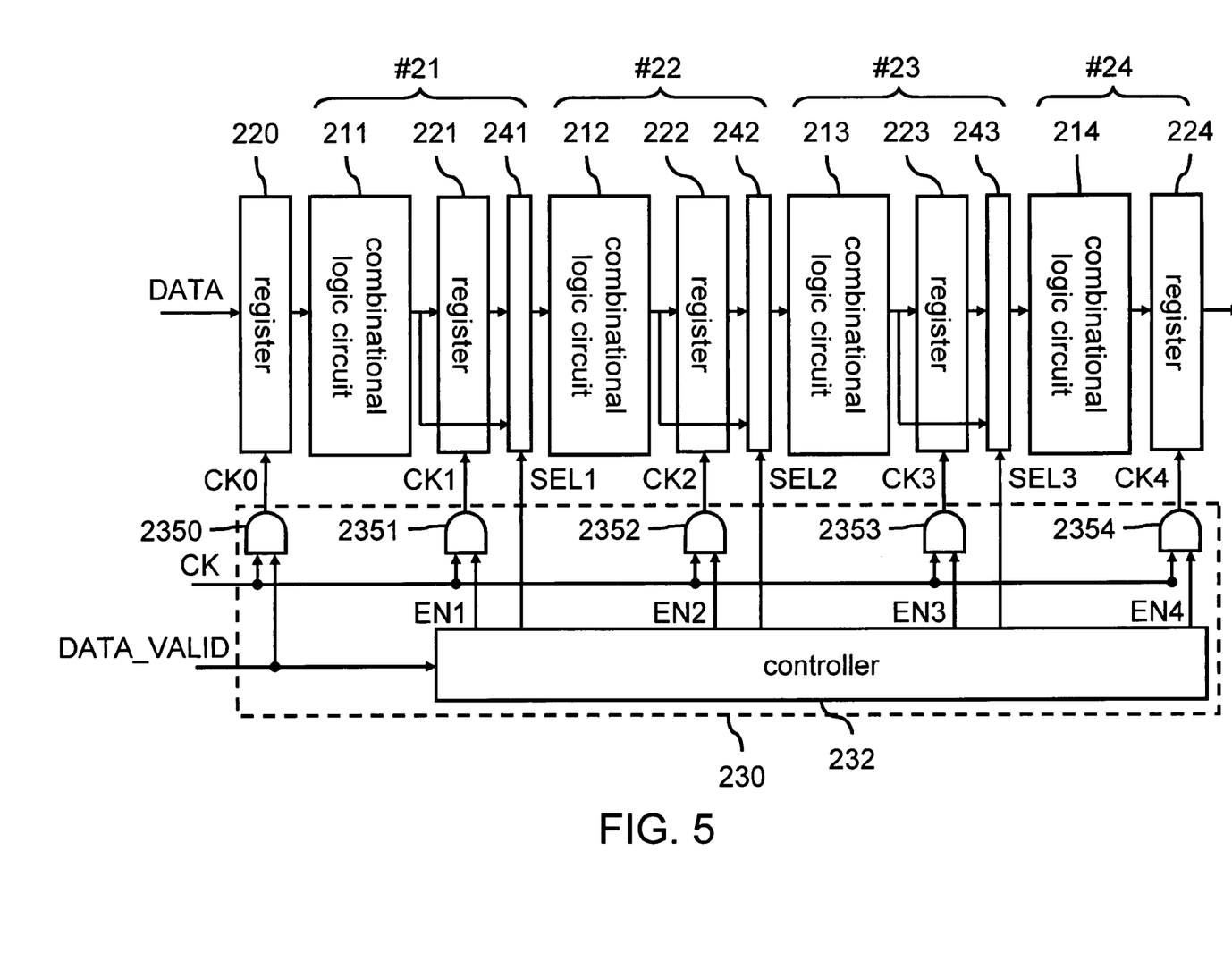
FIG. 5 is a schematic block diagram of the pipelined datapath with dynamically reconfigurable pipeline stages according to another embodiment of the invention.

With reference to FIG. 5, the pipelined circuit has four pipeline stages (i.e. N=4) that are coupled in series. However, this is just an embodiment of the invention. In practice, one may use more or fewer pipeline stages. In this embodiment, the first pipeline stage #21 includes a combinational logic circuit 211, a register 221 and a multiplexer 241. The output of the combinational logic circuit 211 is coupled to the register 221 and the multiplexer 241. The output of the register 221 is coupled to the multiplexer 241. The second pipeline stage #22 includes a combinational logic circuit 212, a register 222 and a multiplexer 242. The output of the combinational logic circuit 212 is coupled to the register 222 and the multiplexer 242. The output of the register 222 is coupled to the multiplexer 242. The third pipeline stage #23 includes a combinational logic circuit 213, a register 223 and a multiplexer 243. The output of the combinational logic circuit 213 is coupled to the register 223 and the multiplexer 243. The output of the register 223 is coupled to the multiplexer 243. The fourth pipeline stage #24 includes a combinational logic circuit 214 and a register 224. The output of the combinational logic circuit 214 is coupled to the register 224. The input terminal of the pipelined circuit is provided with an input register 220. The output of the input register 220 is coupled to the input of the combinational logic circuit 211. This embodiment further includes a pipeline controller 230, which controls the operations of the input registers 220, 221, 222, 223, 224 and the multiplexers 241, 242, 243 according to the system clock CK and the valid data signal DATA_VALID. It has a controller 232 and five AND gates 2350, 2351, 2352, 2353, 2354. The controller 232 is coupled to the multiplexers 241 to 243 and to the registers 221 to 224 via the AND gates 2351 to 2354. An AND gate 2350 is coupled to the input register 220 at the input terminal and generates a clock signal CK0 according to the system clock CK and the valid data signal DATA_VALID. It is used to control the data input. That is, when both the system clock CK and the valid data signal DATA_VALID have a pulse, the clock signal CK0 generated by the AND gate 2350 also as a pulse to activate the input register 220 for data access. In particular, the data DATA are a multi-bit operation signal, i.e. the operand. When a set of data DATA enters the input register 220, each of the pipeline stages #21 to #24 move data from left to right in a lock-step way. Moreover, in each clock cycle the registers 221 to 224 latch the output of the combinational logic circuits 211 to 214 according to the received clock signals CK1, CK2, CK3, CK4. Therefore, a resulting datum is obtained at the output terminal of the register 224. That is, the controller 232 in the pipeline controller 230 generates the enable signals EN1 to EN4 according to the valid data signal DATA_VALID and distributes them to the AND gates 2351 to 2354. Simultaneously, select signals SEL1, SEL2, SEL3 are generated and transmitted to the multiplexers 241 to 243. The AND gates 2351 to 2354 generate the clock signals CK1 to CK4 according to the system clock CK and the enable signals EN1 to EN4, thereby determining whether to activate the registers 221 to 224. The multiplexers 241 to 243 selectively output the data from the registers 221 to 223 or bypassing the registers 221 to 223 according to the received select signals SEL1 to SEL3. That is, when a valid datum is received by the combinational logic circuit, the register is activated and the multiplexer outputs the data from the register to the combinational logic circuit at the next stage. When an invalid datum is received by the combinational logic circuit, the register is not activated and the multiplexer sends the data bypassing the register to the combinational logic circuit at the next stage.

In other words, when the system clock and the enable signal received by an AND gate have a pulse, the clock signal generated by the AND gate also has a pulse to activate the coupled register, thereby latching the output of the combinational logic circuit at this pipeline stage. In this case, the select signal generated by the controller to the multiplexer enables the multiplexer to output the data from the register to the next stage.

Figure 6A:
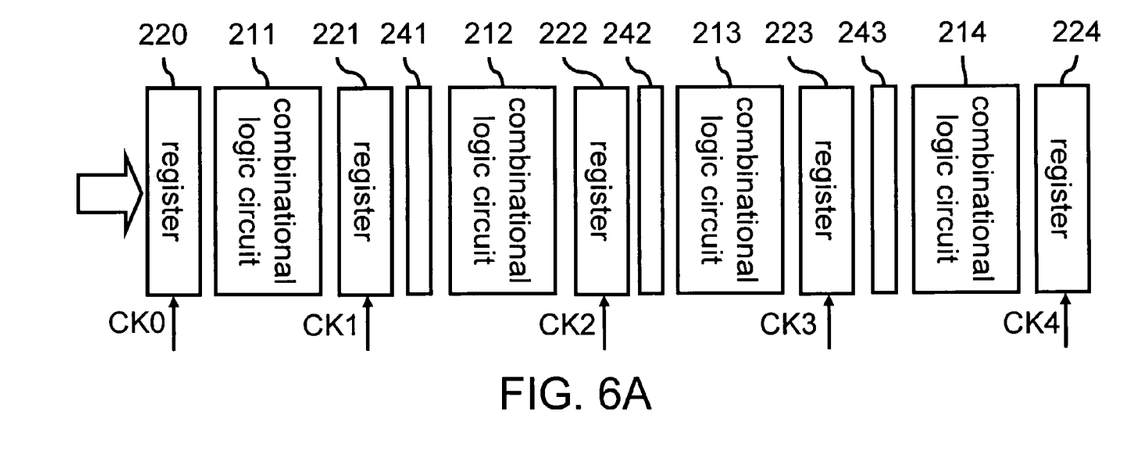
FIGS. 6A to 6D illustrates an exemplary block diagram showing the operation of the pipelined datapath with dynamically reconfigurable pipeline stages in FIG. 5.
Figure 6B:
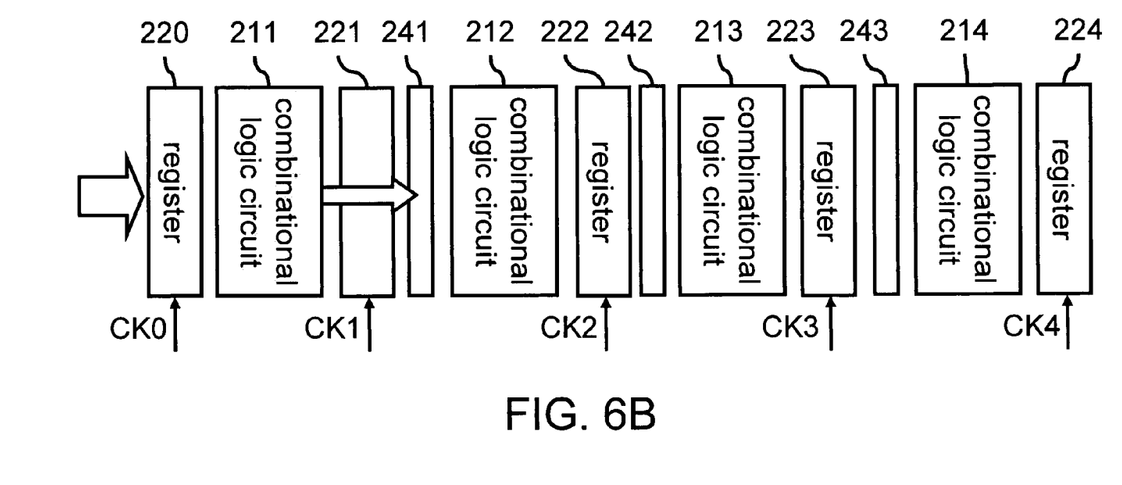
Figure 6C:
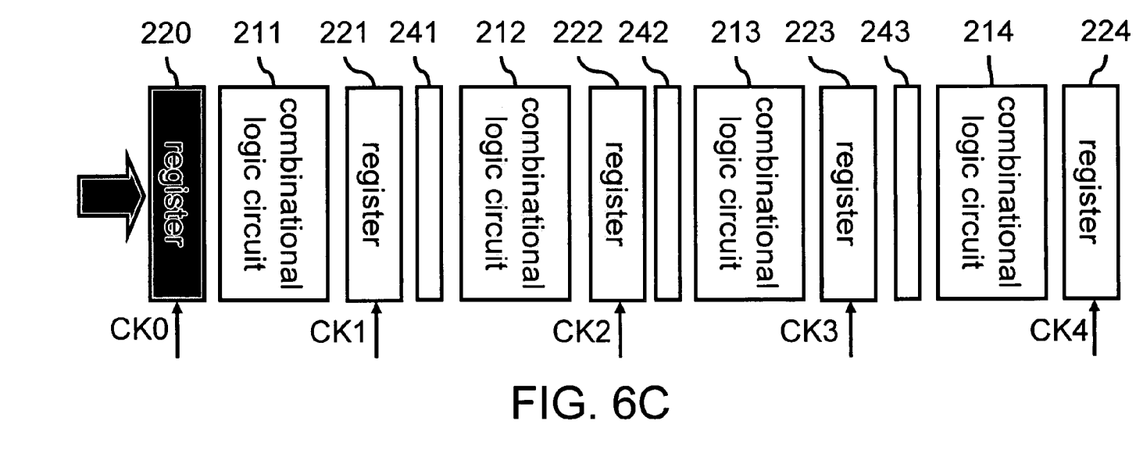
Figure 6D:
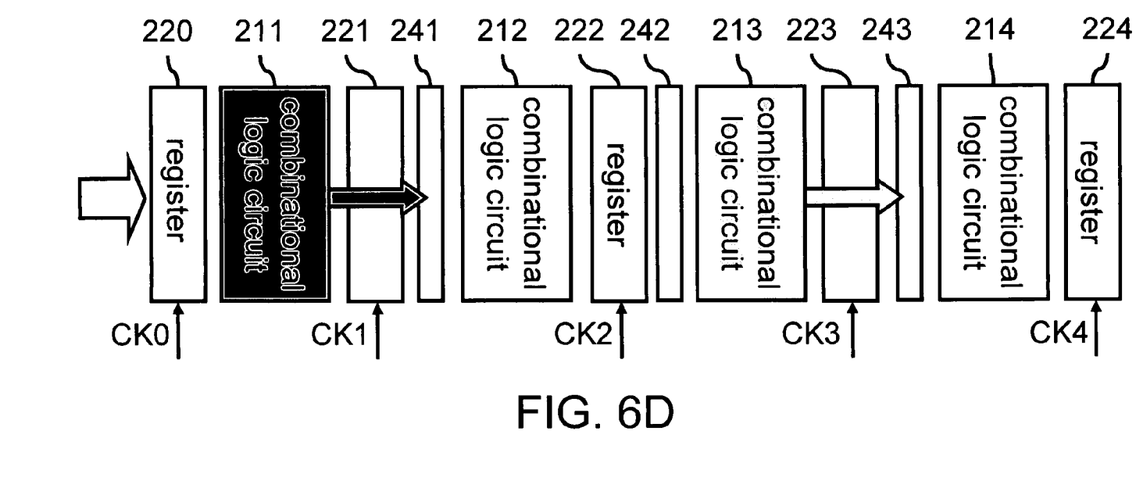

Please refer to FIGS. 6A to 6B. Suppose a valid datum (hereinafter as D1) enters at time 1, the input register 220 receives the clock signal CK) with a pulse and latches the input datum, as shown in FIG. 6A. Suppose an invalid datum enters at time 2. The register 221 receives a clock signal CK1 without any pulse and is not activated. D1 directly bypasses the register 221 using the multiplexer 241, as shown in FIG. 6B. Suppose another valid datum (hereinafter as D2) enters at time 3. The register 220 is activated to latch D2 and the register 222 is activated to latch D1. Thus, the input register 220 keeps D2 and the register 222 keeps D1, as shown in FIG. 6C. Afterwards, suppose another invalid datum enters at time 4, D1 and D2 bypass the registers 223, 221, respectively, using the multiplexers 243, 241, as shown in FIG. 6D. In FIGS. 6A to 6D, the positions of D1 and D2 are labeled with light gray and dark gray colors, respectively. Using the above-mentioned method, the signal control of the pipeline controller can dynamically reconfigure the pipeline stages to finish all data processing. This can effectively reduce power consumption.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pipelined datapath with dynamically reconfigurable pipeline stages, comprising: a pipeline controller for receiving a system clock and a valid data signal to generate N+1 clock signals according to the system clock and the valid data signal and to generate N−1 select signals according to the valid data signal, where N is an integer greater than 1; an input register coupled to the pipeline controller, for receiving one of the clock signals and selectively receiving a datum according to the received clock signal; and N pipeline stages, coupled in series, wherein a first pipeline stage of the pipeline stages is coupled to an output terminal of the input register, and each of the pipeline stages includes: a combinational logic circuit for processing the datum; and a register for receiving one of the clock signal and selectively latching an output of the combination logic circuit according to the received clock signal; wherein each of the first to a (N−1)th pipeline stages further includes: a multiplexer for receiving one of the select signals, and selectively outputting the datum from one of the combinational logic circuit and the register into the combinational logic circuit of a next pipeline stage according to the received select signals.

2. The pipelined datapath with dynamically reconfigurable pipeline stages of claim 1, wherein in each of the pipeline stages, the register is coupled to an output terminal of the combinational logic circuit and the pipeline controller; and wherein in each of the first to the (N−1)th pipeline stages, the multiplexer is coupled to the output terminal of the combinational logic circuit, the output terminal of the register, the pipeline controller, and the output terminal of the combinational logic circuit of the next pipeline stage.

3. The pipelined datapath with dynamically reconfigurable pipeline stages of claim 1, wherein the pipeline controller comprises: a controller coupled to each of the multiplexers, for generating N enable signals and N−1 select signals according to the valid data signal, wherein the select signals is respectively outputted into the multiplexers to control the multiplexers; and N+1 logic elements, of which a first logic element is coupled to the input register to generate one of the clock signals according to the system clock and the valid data signal, thereby controlling the input register, and of which each of a second to a (N+1)th logic elements is coupled to one of the registers and the controller for receiving one of the system clocks and the enable signals and for generating one of the clock signals according to the system clock and the enable signal, thereby controlling the register coupled.

4. The pipelined datapath with dynamically reconfigurable pipeline stages of claim 3, wherein when the datum is a valid datum, at least one of the registers receives the clock signal with a pulse such as to be activated to latch the datum, and the multiplexer coupled to the register activated outputs the datum from the register activated.

5. The pipelined datapath with dynamically reconfigurable pipeline stages of claim 3, wherein when the datum is an invalid datum, the registers receive the clock signals without the pulse such as to be not activated, and the multiplexers output the datum bypassing the registers.

6. The pipelined datapath with dynamically reconfigurable pipeline stages of claim 5, wherein the invalid datum is a datum that does not require processing.

7. The pipelined datapath with dynamically reconfigurable pipeline stages of claim 6, wherein the datum that does not require processing is a datum with a vanishing coefficient when the pipelined datapath is used to perform a multiplication operation.

8. The pipelined datapath with dynamically reconfigurable pipeline stages of claim 5, wherein the invalid datum involves a repetitive operation.

9. The pipelined datapath with dynamically reconfigurable pipeline stages of claim 3, wherein the logic elements are (N+1) AND gates.

10. The pipelined datapath with dynamically reconfigurable pipeline stages of claim 1, wherein when the datum is a valid datum, at least one of the registers is activated to latch the datum, and the multiplexer coupled to the register activated outputs the datum from the activated register.

11. The pipelined datapath with dynamically reconfigurable pipeline stages of claim 1, wherein when the datum is invalid datum, the registers are not activated and the multiplexers output datum bypassing the registers.

12. The pipelined datapath with dynamically reconfigurable pipeline stages of claim 11, wherein the invalid datum is a datum that does not require processing.

13. The pipelined datapath with dynamically reconfigurable pipeline stages of claim 12, wherein the datum that does not require processing is a datum with a vanishing coefficient when the pipelined datapath is used to perform a multiplication operation.

14. The pipelined datapath with dynamically reconfigurable pipeline stages of claim 11, wherein the invalid datum involves a repetitive operation.

* * * * *